(12) United States Patent
Koorapaty et al.

(10) Patent No.: US 8,965,428 B2
(45) Date of Patent: Feb. 24, 2015

(54) SYSTEMS, METHODS AND DEVICES FOR REDUCING IMPACT OF FADING DIPS ON RADIO CHANNELS

(75) Inventors: Havish Koorapaty, Saratoga, CA (US); Jan-Erik Berg, Sollentuna (SE); Jonas Hansryd, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 385 days.

(21) Appl. No.: 13/556,625

(22) Filed: Jul. 24, 2012

(65) Prior Publication Data
US 2014/0031072 A1     Jan. 30, 2014

(51) Int. Cl.
*H04B 15/00*     (2006.01)
(52) U.S. Cl.
USPC .......................................... 455/506; 455/504
(58) Field of Classification Search
CPC .............................. H04B 1/711; H04B 1/7097
USPC ................... 455/504, 506, 63.1, 67.13, 114.2
See application file for complete search history.

(56) References Cited

FOREIGN PATENT DOCUMENTS

| WO | WO 2008/029411 A1 | 3/2008 |
|----|-------------------|--------|
| WO | WO 2012/037643 A1 | 3/2012 |

OTHER PUBLICATIONS

International Search Report corresponding to International Application No. PCT/IB2013/055046 mailed Dec. 18, 2013, 5 pages.
Written Opinion of the International Searching Authority corresponding to International Application No. PCT/IB2013/055046 mailed Dec. 18, 2013, 8 pages.
3GPP TR 36.932, V12.0.0; "$3^{rd}$ Generation Partnership Project; Technical Specification Group Radio Access Network; Scenarios and Requirements for Small Cell Enhancements for E-UTRA and E-UTRAN (Release 12)" 3GPP Standard; 3GPP TR 36.932, $3^{rd}$ Generation Partnership Project (3GPP), Mobile Competence Centre; 650, Route Des Lucioles; F-06921 Sophia-Antipolis Cedex; France, vol. TSG RAN, No. V12.0.0, Dec. 7, 2012, pp. 1-14, XP050690912.
Coldrey M. et al.: "Small-Cell Wireless Backhauling: A Non-Line-of-Sight Approach for Point-to-Point microwave Links" Vehicular Technology Conference (VTC Fall), 2012 IEEE, Sep. 3, 2012, pp. 1-5, XP032294861, DOI: 10.1109/VTCFALL.2012.6399286; ISBN: 978-1-4673-1880-8.

*Primary Examiner* — Raymond Dean
(74) *Attorney, Agent, or Firm* — Myers Bigel Sibley & Sajovec, P.A.

(57) ABSTRACT

The impact of a fading dip in a radio channel on the communication between a first and a second antenna may be reduced by receiving a sounding signal at the first antenna or the second antenna over the radio channel and measuring the frequency response of the radio channel using this sound signal that was received. The radio frequency signal that is used to communicate between the first antenna and the second antenna is adjusted in response to the frequency response that was measured in order to reduce an impact of the fading dip in the radio channel on the radio frequency signal during operation. Related systems, methods, and devices are disclosed.

21 Claims, 14 Drawing Sheets

SYSTEMS, METHODS AND DEVICES FOR REDUCING IMPACT OF FADING DIPS ON RADIO CHANNELS

TECHNICAL FIELD

Various embodiments described herein relate to radio frequency communications and, more particularly, to wireless communication networks and devices, and methods of operating same.

BACKGROUND

Wireless communication networks are increasingly being used for wireless communication with various types of wireless user equipment. The wireless network itself may include a plurality of space-apart wireless base stations, also commonly referred to as "base stations", "radio access nodes" or simply as "nodes", that define a plurality of cells, and a core network that controls the nodes and interfaces the nodes with other wired and/or wireless networks. The nodes may be terrestrial and/or space-based. The nodes communicate with wireless User Equipment (UE) using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system).

Various types of base stations have been employed during the evolution of wireless communications networks to define various types and sizes of cells. The cellular industry refers to specific types of cells using loosely defined terms such as macro-cells, micro-cells and pico-cells in respective order of decreasing size. For example, cells, now often referred to as "macro-cells", are deployed to provide the widest coverage area. Macro-cell base stations may have typical power output ranges from the tens to hundreds of watts, and macro-cell diameters of up to 10 km or more in size may be provided. A typical macro-cell has a site with a tower mounted antenna. Smaller cells, now typically referred to as "micro-cells", are also deployed to provide additional fill-in capacity where needed over relatively short ranges, such as about 300 m to about 2,000 m, and may have an output power of a few watts. Even smaller and lower power base stations, often referred to as "pico-base stations" have been deployed with power outputs of less than about 1 watt to 5 watts and cell sizes of about 200 m or less. While these definitions are provided to frame the succeeding material, it should be noted that various embodiments described may herein relate to a hierarchy with macro-cells having large coverage areas and pico-cells having smaller coverage areas than macro-cells or micro-cells.

The latest type of small base station is often referred to as a "femto-base station". These femto-base stations may be designed primarily for indoor coverage, and may have power output in the range of between about $\frac{1}{10}$ to $\frac{1}{2}$ watt, and cell size on the order of about 10-30 m. These femto-base stations typically are portable, consumer-deployed units that may use licensed or unlicensed spectrum. Often, the backhaul to the wireless communications network is via a consumer-provided packet data connection such as a cable or DSL data connection, rather than a dedicated or leased line switched circuit backhaul that may be used in the other types of base stations described. Accordingly, femto-base stations are a type of base station that may be referred to generically as a "re-deployable" or "transportable" base station. Some pico-base stations may be re-deployable as well. As such, these various types of re-deployable or transportable base stations will be collectively referred to as "local area base stations."

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion in this section.

SUMMARY OF THE INVENTION

Multipath signal propagation and other effects on a radio channel may cause a fading dip in the radio channel. In some embodiments, a sounding signal may be received at a first antenna or a second antenna over a radio channel. The frequency response of the radio channel may be measured using the sounding signal that is received. In some embodiments, the carrier frequency for transmission of the radio frequency signal between the first antenna and the second antenna is adjusted based on the frequency response that was measured, in order to reduce an impact of the fading dip in the radio channel on the radio frequency signal during operation. The carrier frequency may be selected from a set of available carrier frequencies which are more closely spaced apart than the bandwidth of the radio frequency signal. The carrier frequency to be used for transmission of the radio frequency signal between the first antenna and the second antenna may be selected from a subset of acceptable carrier frequencies. The subset of acceptable carrier frequencies, may be determined from a set of available carrier frequencies, by selecting the available carrier frequencies whose average received radio frequency signal level, within a bandwidth of the radio frequency signal, exceed a minimum average received radio frequency signal level. The carrier frequency corresponding to a greatest average received signal level may be selected.

In other embodiments, a variation between a minimum and maximum signal level within the radio frequency signal bandwidth may be determined for respective ones of the set of available carrier frequencies. The carrier frequency may then be selected based on the variation between the minimum and maximum signal levels within the radio frequency signal bandwidth. The selected carrier frequency may be the available carrier frequency with the lowest variation between the minimum and maximum signal levels.

In some embodiments, a variation between a minimum and maximum signal level within the radio frequency signal bandwidth may be determined for respective ones of the set of available carrier frequencies. A subset of acceptable carrier frequencies whose variation between the minimum and maximum signal level within the radio frequency signal bandwidth is below a threshold may be determined. The carrier frequency for transmission of the radio frequency signal between the first and second antennas may then be selected from the subset of acceptable carrier frequencies. The selected carrier frequency may be the acceptable carrier frequency with the lowest variation between the minimum and maximum signal levels.

In some embodiments, the distance between the first antenna and the second antenna may be adjusted in order to reduce the impact of the fading dip of the radio channel on the radio frequency signal during operation. The second antenna may be a transportable antenna that is fixed in position during operation but is movable in position when not operating. Alternatively, an indication for an operator to move the second antenna may be provided.

In other embodiments, adjusting the distance between the first antenna and the second antenna to reduce the impact of the fading dip of the radio channel on the radio frequency signal may be performed in response to adjustment of the carrier frequency failing to reduce the impact of the fading dip of the radio channel on the radio frequency signal.

In some embodiments, the second antenna may comprise an array of antennas. In these embodiments, adjusting the distance between the first antenna and the second antenna may comprise selecting an antenna from the array of antennas for use in communication between the first antenna and the second antenna. The array of antennas may be collocated or spaced apart from one another.

In some embodiments, the sounding signal may have a bandwidth that is less than a bandwidth of the radio channel. However, in other embodiments, the sounding signal may have a bandwidth equal to the radio channel. Measuring the frequency response of the radio channel may comprise scanning the radio channel by varying the frequency of the sounding signal.

In some embodiments, the first antenna may be included in a node of a wireless communication network and the second antenna may be included in a local area base station of the wireless communication network. The radio channel may comprise a backhaul link between the node of the wireless communication network and the local area base station.

Some embodiments described herein comprise a local area base station including an antenna, a transceiver, and a controller. The transceiver may be configured to receive a sounding signal arriving at the antenna over a radio channel. The controller may be configured to measure the frequency response of the radio channel using the sounding signal that was received. The controller may also adjust, in response to the frequency response that was measured, a radio frequency signal that is to be transmitted by the transceiver in the radio channel, to reduce an impact of a fading dip in the radio channel on the radio frequency signal during operation. The local area base station may adjust the carrier frequency used by the transceiver. The antenna of the local area base station may be a transportable antenna that is fixed in position during operation thereof but is movable in position when not operating. Additionally, the local area base station may provide an indication for an operator to move the local area base station to reduce the impact of the fading dip of the radio channel on the radio frequency signal. In some embodiments, the local area base station may be configured to move the local area base station to reduce the impact of the fading dip of the radio channel on the radio frequency signal.

Additional embodiments described herein include a node of a wireless communication network that comprises an antenna, a transceiver, and a controller. The transceiver may be configured to receive a sounding signal arriving at the antenna over a radio channel. The controller may be configured to measure the frequency response of the radio channel using the sounding signal that was received. Additionally the controller may adjust, in response to the frequency response that was measured, a carrier frequency used by the transceiver, to reduce an impact of a fading dip in the radio channel on a radio frequency signal during operation.

The node of the wireless communication network may determine, from a set of available carrier frequencies, a subset of acceptable carrier frequencies whose average received radio frequency signal level within a bandwidth of the radio frequency signal exceeds a minimum average received radio frequency signal level and/or whose variation of received radio frequency signal level within the radio frequency signal bandwidth falls between a minimum and maximum signal level. The node may also select, from the subset of acceptable carrier frequencies, a carrier frequency for use by the transceiver.

Other wireless devices, radio network nodes, and methods according to embodiments of the invention will be or will become apparent to one with skill in the art upon review of the following drawings and detailed description. It is intended that all such additional wireless devices, radio network nodes, and methods be included within this description, be within the scope of the present invention, and be protected by the accompanying claims. Moreover, it is intended that all embodiments disclosed herein can be implemented separately or combined in any way and/or combination.

DETAILED DESCRIPTION

Figure 1:
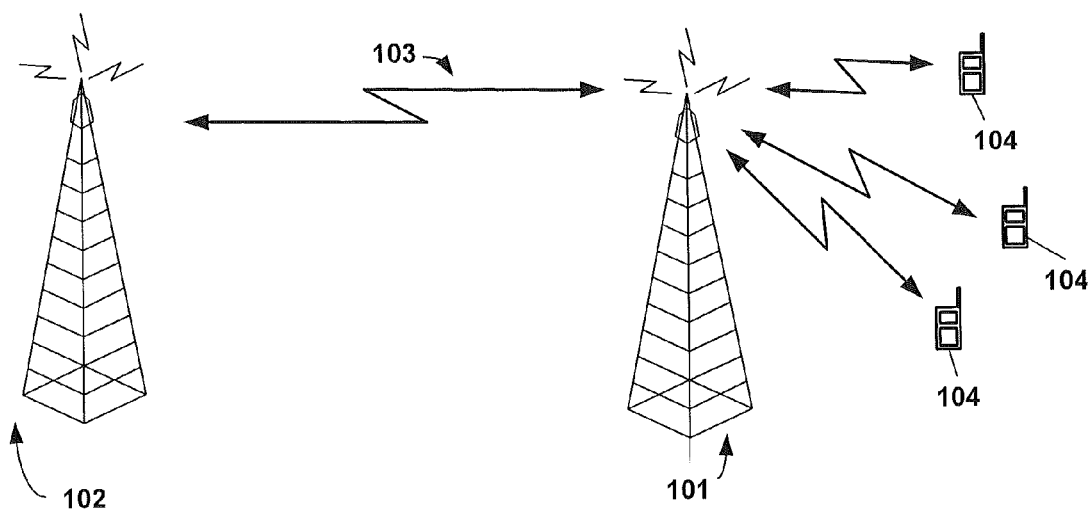
FIG. 1 is a block diagram of a wireless network architecture including nodes that communicate via a backhaul link, according to various embodiments described herein.

The use of mobile broadband services using cellular networks continues to increase. There is also an ongoing evolution of 3G and 4G cellular networks like HSPA/LTE/WiMAX in order to support ever increasing performance with regards to capacity, peak bit rates and/or coverage. Operators deploying these networks are faced with a number of challenges, for example, relating to site and transport costs, installation complexities, and availability and lack of wireless spectrum. Operators are increasingly using local area base stations to improve performance and availability of broadband services by allowing User Equipment to have better access to communication services. Local area base stations may communicate over wireless backhaul links to the network. These wireless backhaul links may be subject to multipath propagation that results in fading. Installation of the local area base stations is challenging in multipath fading environments. In particular, fading dips in the radio channel may degrade performance on the wireless backhaul links of the local area base stations. Fading dips may represent destructive interference experienced by a signal as a result of multiple copies of the signal traversing different paths to a receiver and/or interference resulting from any other aspect of multipath propagation.

Conventionally, fading dips may be compensated for by using equalization or other post processing techniques. However, various embodiments described herein may reduce the occurrence and impact of the fading dips by, for example, adjusting the carrier frequency and/or adjusting distance between the antennas.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, some embodiments are described herein in the context of operating a local area base station that interfaces to a network over a backhaul link over a radio channel. The local area base station communicates over radio communication channels with wireless terminals (also referred to as UEs). It will be understood, however, that the present invention is not limited to such embodiments and may be embodied generally in any type of wireless communication network that is subject to fading dips.

As used herein, wireless terminals or UEs can include any device that receives data from a communication network, and may include, but is not limited to, a mobile telephone ("cellular" telephone), laptop/portable computer, pocket computer, hand-held computer, and/or desktop computer. As used herein, nodes, also commonly referred to as "base stations", "eNodeB", "radio access nodes" or simply as "nodes", define a plurality of cells, and a core network that controls the nodes and interfaces the nodes with other wired and/or wireless networks. Additionally, as used herein, a local area base station can include any device that receives data from a backhaul link of a communication network, and may include, but is not limited to, "picocells", "macrocells", "microcells", "femtocells", "small cellular base stations", "access point base stations", "hot spots" or "local area base stations."

FIG. 1 is a block diagram of a wireless network architecture including nodes 101 and 102 that communicate via a backhaul link 103, according to some embodiments described herein. UEs 104 communicate with the node 101 for interfacing to the network via backhaul link 103. Accordingly, nodes 101 and 102 may, for example, include microcell or macrocell embodiments. The impact of fading dips may be reduced as will be discussed extensively below.

Figure 2:
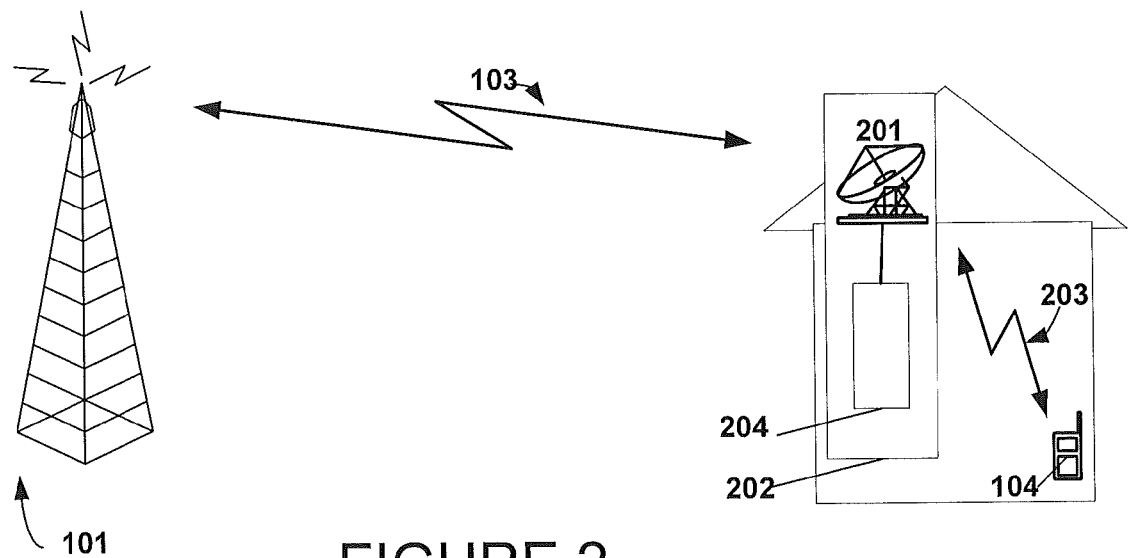
FIG. 2 is a block diagram of a wireless network architecture including a local area base station with an external antenna that communicates with a node and user equipment, according to various embodiments described herein.

FIG. 2 is a block diagram of a wireless network architecture including a local area base station 202 with an external antenna 201 that communicates with a node 101 and user equipment 104, according to various embodiments described herein. The local area base station 202 comprises circuitry 204 that communicates through an external antenna 201 with a node 101 in the network over a backhaul link 103. The UE 104 may be in communication with a local area base station 202, such as a picocell or macrocell, via a wireless link 203, or in direct communication to the node, as illustrated in FIG. 1. The impact of fading dips may be reduced as will be discussed extensively below.

Figure 3:
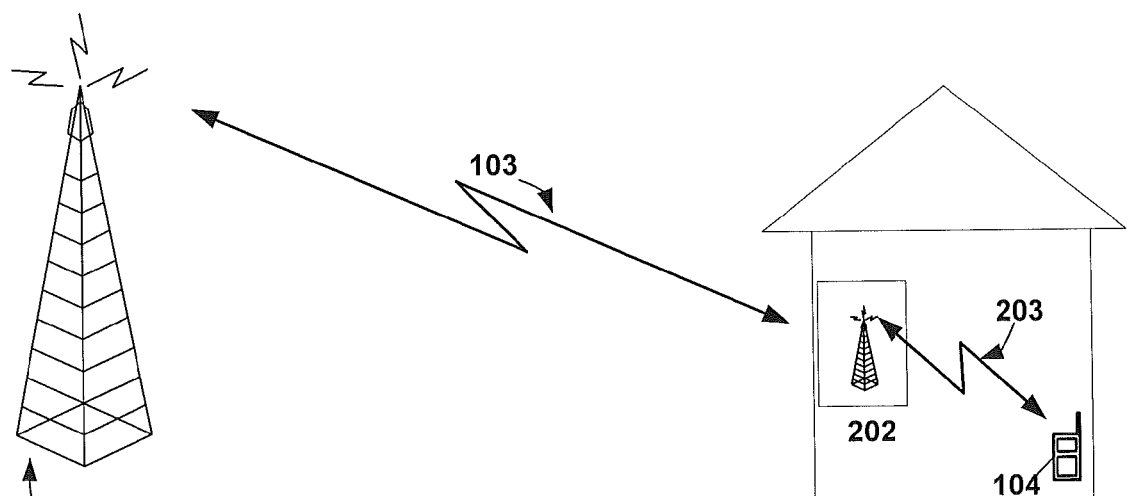
FIG. 3 is a block diagram of a wireless network architecture including a local area base station with an internal antenna that communicates with a node and user equipment, according to various embodiments described herein.

FIG. 3 is a block diagram of a wireless network architecture including a local area base station 202 with an internal antenna that communicates with a node 101 and UE 104, according to various embodiments described herein. The local area base station 202 communicates with a node 101 in the network over a backhaul link 103. The UE 104 may be in communication with a local area base station 202 such as a picocell or macrocell, via a wireless link 203. The impact of fading dips may be reduced as will be discussed extensively below.

The wireless network architectures of FIGS. 1-3 may be impacted by fading dips in the radio channel. Various embodiments described herein may reduce the impact of fading dips in the radio channel by using sounding signals to measure the frequency response of the radio channel and adjusting a radio frequency signal in the radio channel in response to the frequency response that was measured. The adjusting may include, for example, adjusting the carrier frequency and/or adjusting the distance between the antennas.

Figure 4:
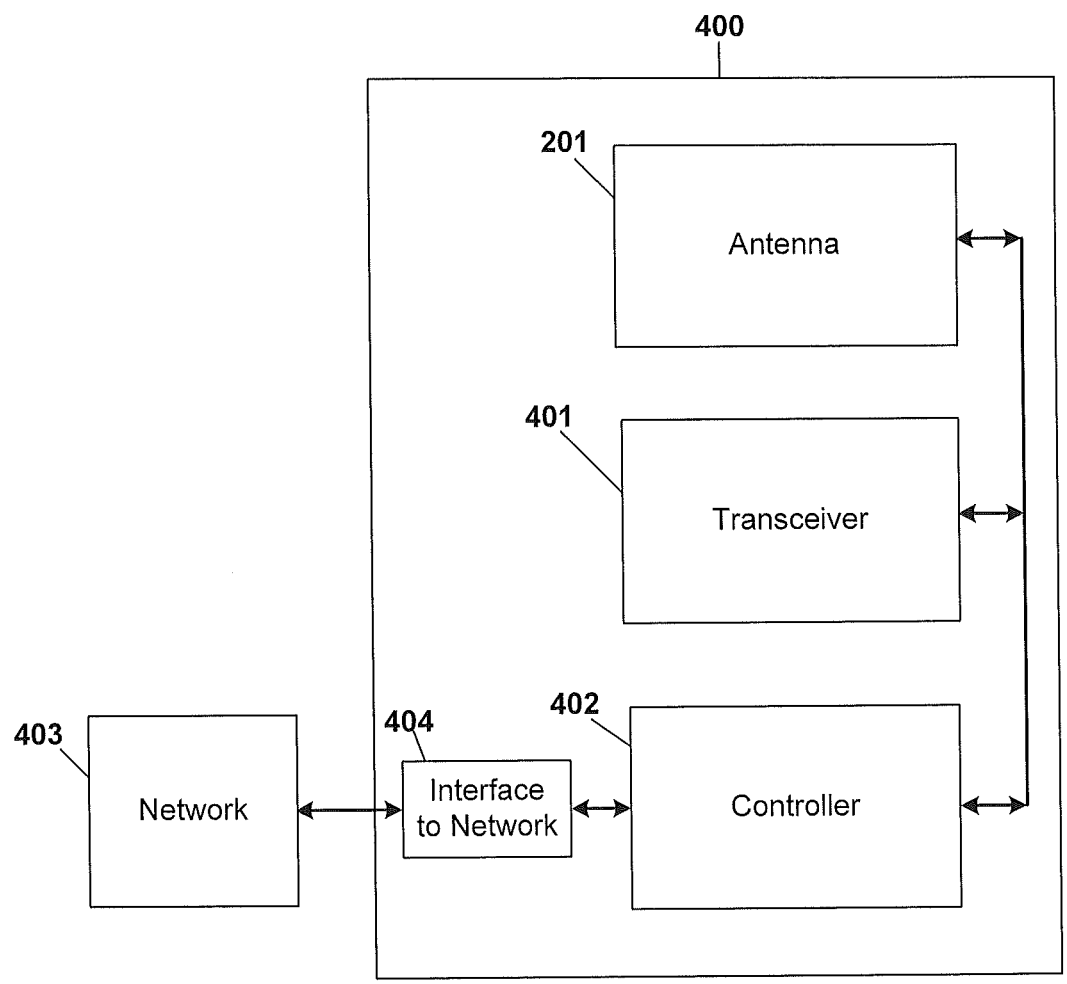
FIG. 4 is a block diagram of a local area base station comprising an antenna, transceiver, controller, and an interface to an external network, according to various embodiments described herein.

FIG. 4 is a block diagram of a base station 400 which may include a node 101 of FIG. 1 and/or a local area base station 202 of FIGS. 2 and 3. The node 400 of FIG. 4 comprises an antenna 201, transceiver 401, controller 402, and an interface 404 to an external network 403, according to various embodiments described herein. As illustrated in FIGS. 2 and 3, the antenna 201 may be internal or external to the local area base station 202. Additionally the local area base station and its serving antenna may be coupled in wired or wireless fashion. In some embodiments, the transceiver 401 may be configured to receive a sounding signal arriving at the antenna over a radio channel. The controller 402 may be configured to measure the frequency response of the radio channel using a sounding signal that is received. In some embodiments, the controller 402 may be configured to adjust, in response to the frequency response that was measured, a radio frequency signal that is to be transmitted by the transceiver in the radio channel so as to reduce the impact of the fading dip.

Figure 5:
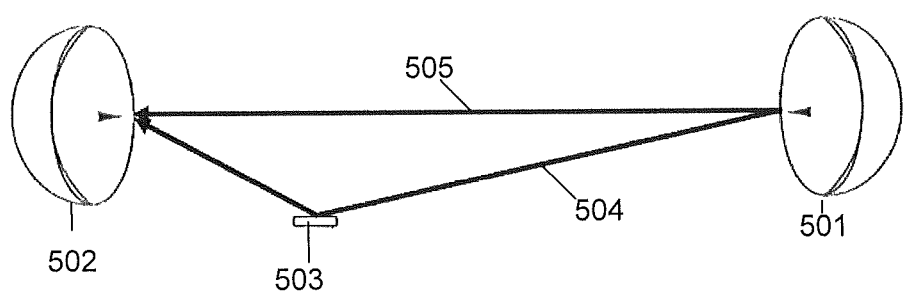
FIG. 5 is a diagram that illustrates two transmit/receive antennas operating in a multipath fading environment, according to various embodiments described herein.

FIG. 5 is a diagram that illustrates two transmit/receive antennas 501 and 502 operating in a multipath fading environment. These transmit/receive antennas may be embodied by FIG. 1, FIG. 2, FIG. 3 or wireless links such as a fixed microwave line-of-sight or non-line-of-sight communication links. A scattering object 503 is in the radio channel that causes at least one signal path 504 in the radio channel to be delayed from another signal path 505 in the radio channel. The scattering objects may include, for example, buildings, trees, particles in the atmosphere and other objects that inhibit line of sight communication. Multipath delays may also be caused by refraction of signal paths through the air. These resulting multiple signal paths, also referred to as multipath propagation, may create an effect known as fading. At higher frequencies of transmission, as is common in recent implementations of wireless backhaul links, multipath propagation may also be a result of factors such as temperature differences in between air layers. Multipath propagation causes signal fading in certain frequency bands. In other words, the signal magnitude may be reduced at certain frequencies. This phenomenon is commonly referred to as frequency selective signal fading.

Figure 6:
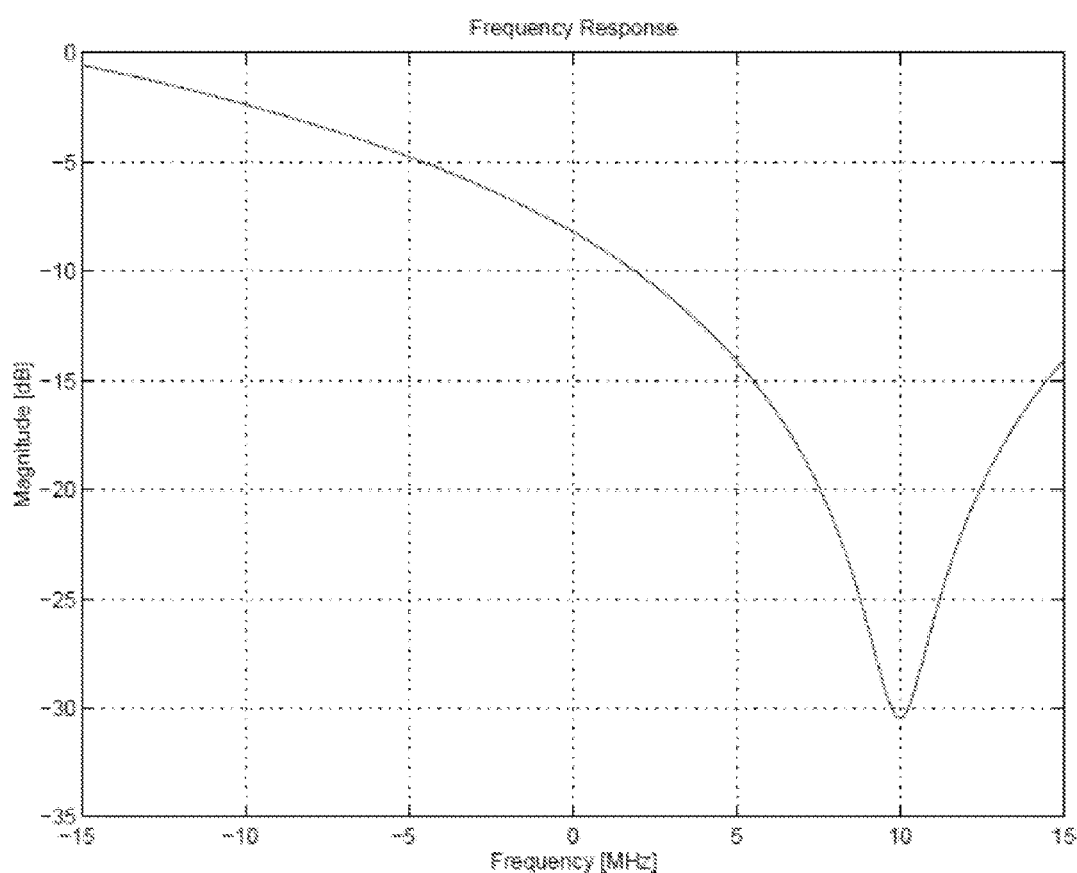
FIG. 6 graphically illustrates a frequency response of a two-ray multipath channel, according to various embodiments described herein.

FIG. 6 graphically illustrates the frequency response of a two-ray multipath channel illustrating frequency selective signal fading around 10 MHz. The signal fading shown in this example is more pronounced around 10 MHz and this area of deep fading may be referred to as a fading dip. The fading dips in the radio channel may reduce the quality of communication of a radio frequency signal in the radio channel.

Figure 7:
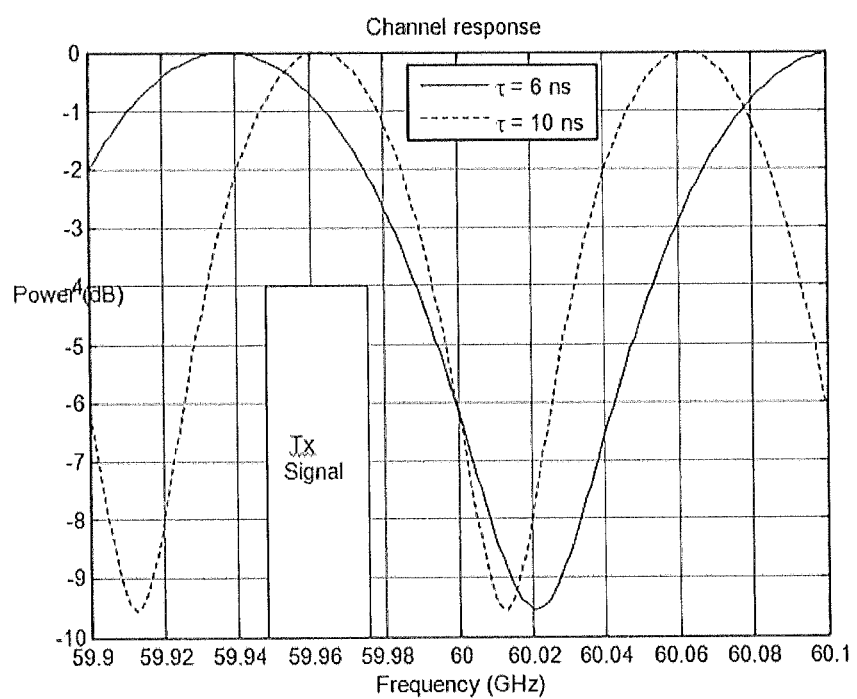
FIG. 7 graphically illustrates channel frequency response variations with different path delays, according to various embodiments described herein.

FIG. 7 is now referenced, which graphically illustrates the channel response for a signal transmitted at a carrier frequency of 60 GHz through a 2-path channel. FIG. 7 shows the response for two cases. In the first case, the relative time delay between the two paths 504 and 505 of FIG. 5 is 6 nanoseconds (ns). In the second case, the relative time delay is 10 ns. A radio frequency transmit (Tx) signal to be transmitted with 28 MHz signal bandwidth is positioned in this 60 GHz band such that the fading dips caused by the two delay cases in this multipath channel are reduced or avoided. Effective positioning of the radio frequency signal to reduce the impact of the fading dip in the radio channel will be discussed below in further detail. In general, various embodiments described herein may adjust a radio frequency signal in the radio channel to reduce the impact of the fading dip. The radio frequency signal may be adjusted by adjusting the carrier frequency and/or by adjusting the distance between the antennas.

Figure 8:
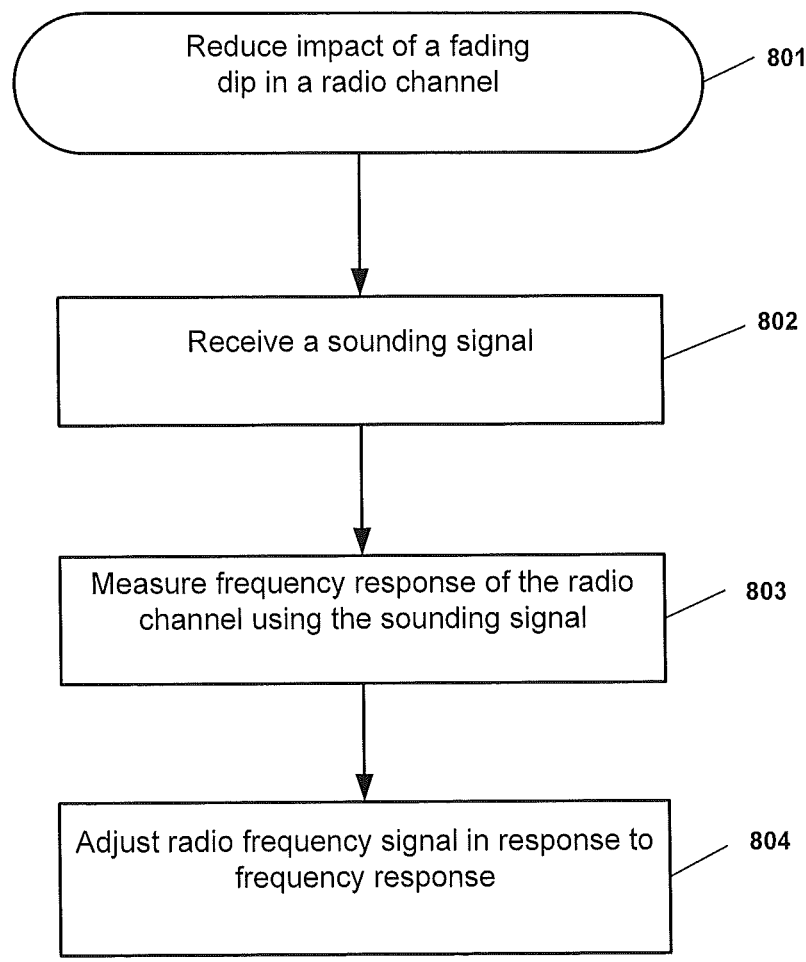
FIG. 8 is a flowchart illustrating reducing of the impact of a fading dip in a radio channel, according to various embodiments described herein.

FIG. 8 is a flowchart illustrating operations 801 that may be performed by a local area base station or a node in a wireless network to reduce the impact of a fading dip in a radio channel between two antennas on radio frequency signals that are used for communication. These operations may be performed by node 101 of FIG. 1, node 202 of FIG. 2 or FIG. 3, and/or node 400 of FIG. 4. As shown in block 802, a sounding signal is received at an antenna over the radio channel. This antenna that receives the sounding signal may be associated with a local area base station or with a node in a wireless network. If this antenna is associated with a local area base station, this antenna may be internal or collocated with the local area base station or be an external antenna coupled to the local area base station. Similarly, if this antenna is associated with a node, this antenna may be internal or collocated with the node or be an external antenna coupled to the local area base station. Once the sounding signal is received, the frequency response of the radio channel is measured using the sounding signal, as illustrated in block 803. Once the frequency response of the channel has been measured, the radio frequency signal that is used to communicate over the radio channel is adjusted to reduce the impact of any fading dips during operation, as illustrated in block 804.

The sounding signal used to measure the channel response may have a bandwidth that is less than the bandwidth of the radio channel. In this case and in other embodiments, measuring of the frequency response may comprise scanning the radio channel by varying the frequency of the sounding signal. The raster size over which the scanning occurs may be smaller than the signal bandwidth. In some embodiments, the bandwidth of the sounding signal may be equal to the bandwidth of the radio frequency signal. In these embodiments, the antennas and/or transceivers for transmitting and receiving the sounding signals may be shared for transmitting and receiving of the radio frequency signal. The antennas and transceivers may already be tuned for receiving signals of the radio frequency bandwidth while signal filters and other circuitry may be reused if the bandwidth of the sounding signal is equal to the bandwidth of the radio frequency signal. In further embodiments, the bandwidth of the sounding signal may be equal to the bandwidth of the radio channel. In these cases, the entire radio channel may be characterized by a single transmission of the sounding signal.

Figure 9:
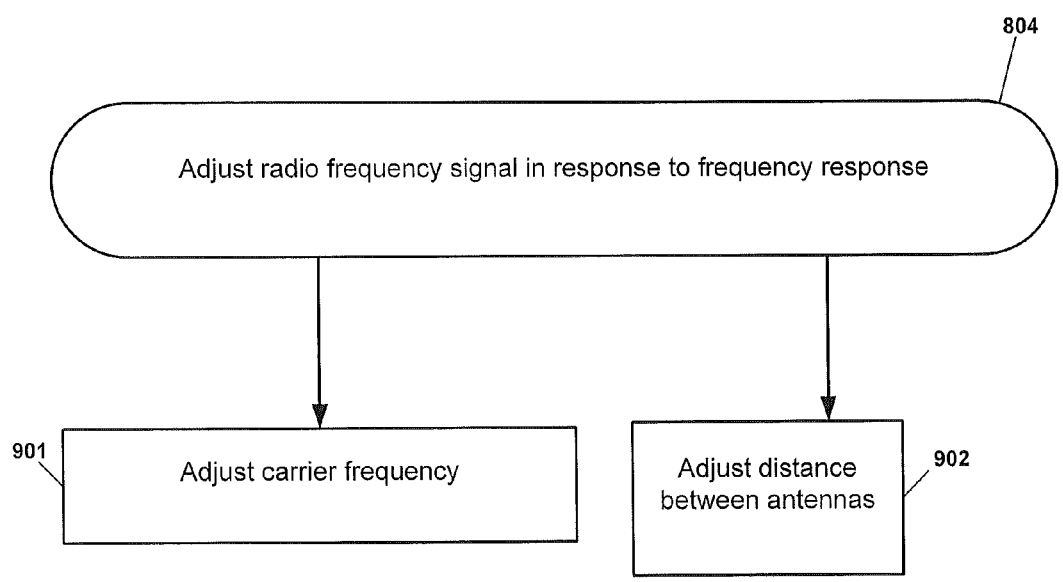
FIG. 9 is a flowchart illustrating adjusting of a radio frequency signal in response to a measured frequency response of a channel by selecting a carrier frequency or adjusting a distance between antennas, according to various embodiments described herein.

FIG. 9 is a flowchart illustrating adjustment of the radio frequency signal based on the frequency response of the radio channel, corresponding to block 804 of FIG. 8. In some embodiments, the carrier frequency may be adjusted based on the frequency response, as illustrated in block 901. In other embodiments, the distance between the antennas may be adjusted, as illustrated in block 902.

Figure 10:
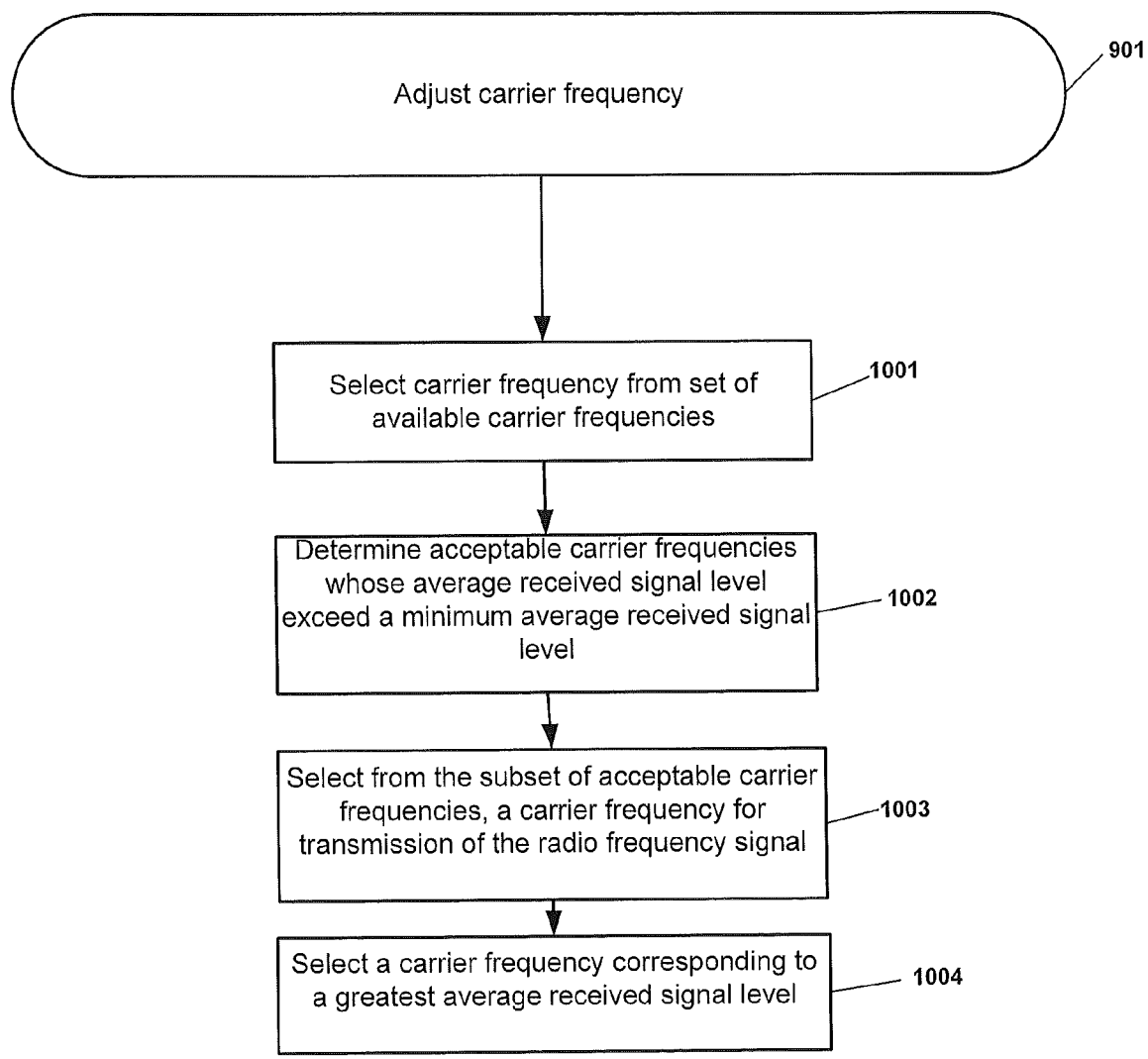
FIG. 10 is a flowchart illustrating adjusting of a radio frequency signal in response to a measured frequency response of a channel by selecting a carrier frequency based on an average received signal level, according to various embodiments described herein.

FIG. 10 is a flowchart illustrating adjusting the carrier frequency, corresponding to block 901 of FIG. 9. In some embodiments, the carrier frequency may be selected from a set of available carrier frequencies, as shown in block 1001. These available carrier frequencies may be a defined set of channels that are spaced apart by increments less than the signal bandwidth. In other words, the available carrier frequencies may be more closely spaced apart than a bandwidth of the radio frequency signal. In other embodiments, the available carrier frequencies may be spaced apart by at least the signal bandwidth.

In some embodiments, a subset of acceptable carrier frequencies may be determined from the available carrier frequencies whose average received signal level exceeds a minimum average received signal level, as depicted in block 1002 of FIG. 10. The available carrier frequencies may be within a bandwidth of the radio frequency signal centered at the carrier frequency. The minimum average received signal level may be set in a variety of ways by the operator or by determining a suitable level based on the characteristics of the radio channel. The minimum average received signal level may be maintained, constant, or may be variable. The minimum average signal level may also be based on scanning of the channel over the available carrier frequencies. A carrier frequency for transmission of the radio frequency signal may be selected from the subset of acceptable carrier frequencies, as illustrated in block 1003.

A variety of criteria may be used to select the carrier frequency for transmission out of the subset of acceptable carrier frequencies. For example, the carrier frequency corresponding to the greatest average received signal level may be selected, as illustrated in block 1004 of FIG. 10.

Figure 11:
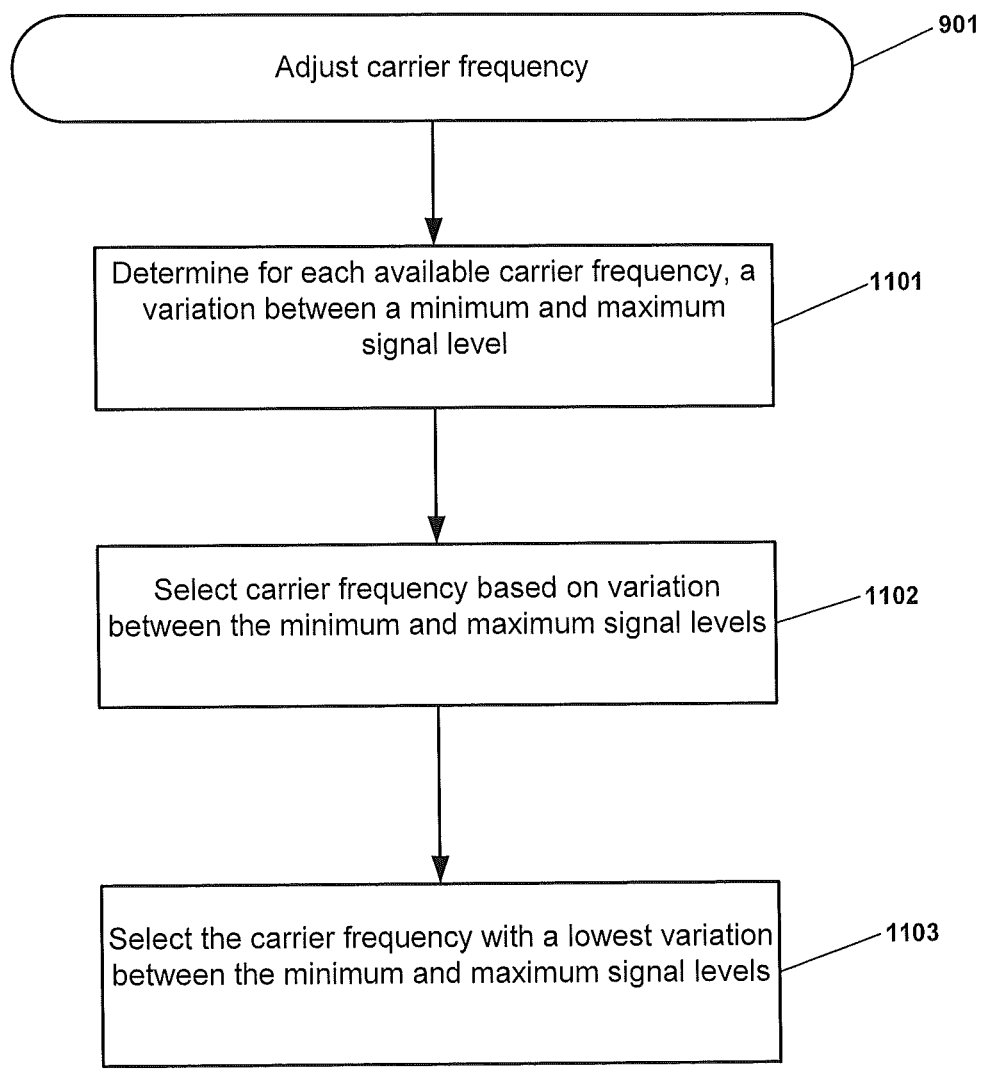
FIG. 11 is a flowchart illustrating adjusting a carrier frequency based on a variation between minimum and maximum signal levels, according to various embodiments described herein.

FIG. 11 illustrates other embodiments of criteria used to select the carrier frequency, corresponding to block 901 of FIG. 9. For each available carrier frequency, a variation between the minimum and maximum signal level may be determined, as shown in block 1101. The carrier frequency used for transmission may be selected based on this variation between the minimum and maximum and signal levels, as illustrated in block 1102. For example, as illustrated in block 1103, the available carrier frequency with the lowest variation between the minimum and maximum signal levels may be selected. In other embodiments, any available carrier frequency whose variation between the minimum and maximum signal levels is above a threshold may be selected. The threshold may be fixed or variable.

Figure 12:
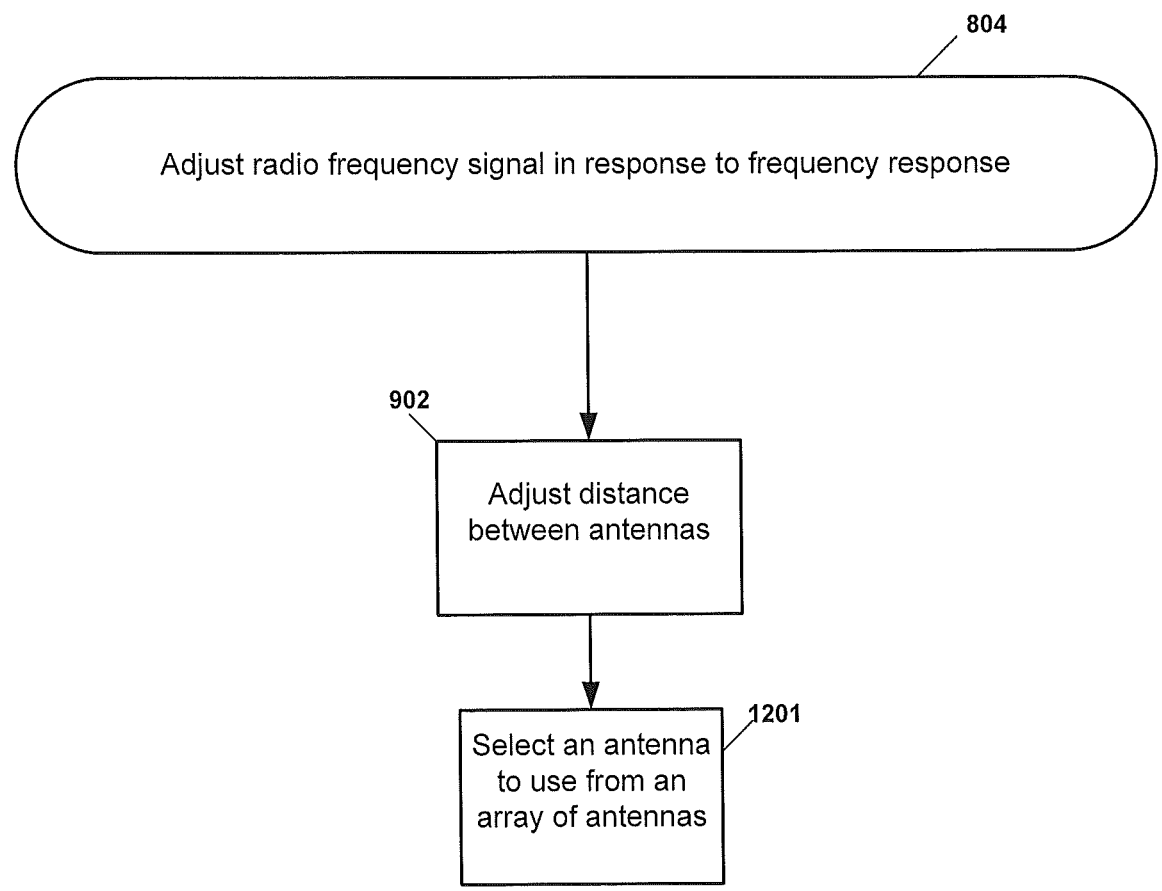
FIG. 12 is a flowchart illustrating adjusting of a radio frequency signal in response to a measured frequency response of the channel by adjusting a distance between antennas or by selection of an antenna from an array of antennas, according to various embodiments described herein.

FIG. 12 illustrates some embodiments of adjusting of the radio frequency signal based on the frequency response that was measured, corresponding to block 804 of FIG. 8. This may be achieved by adjusting the distance between the antennas, as illustrated in block 902. According to some embodiments, the distance between the antennas may be adjusted by physically moving either of the antennas and/or by moving the corresponding node or local area base station. The antenna also may be rotated or otherwise adjusted in its current location. In further embodiments, an antenna used for transmission may be selected from an array of antennas, as illustrated in block 1201. The antennas in the array of antennas may be spaced apart such that the adjustment of the distance, as previously described by block 902, is achieved by selecting one antenna out of the array of antennas. Additionally, a different antenna may be activated that is inherently positioned in a different location, hence potentially altering the distance. The array of antennas may be collocated or spaced apart from one another. Further embodiments may have an antenna array that spans a certain length and the antenna that provides an acceptable link performance or the best link performance is selected by checking the channel characteristics corresponding to each antenna.

Figure 13:
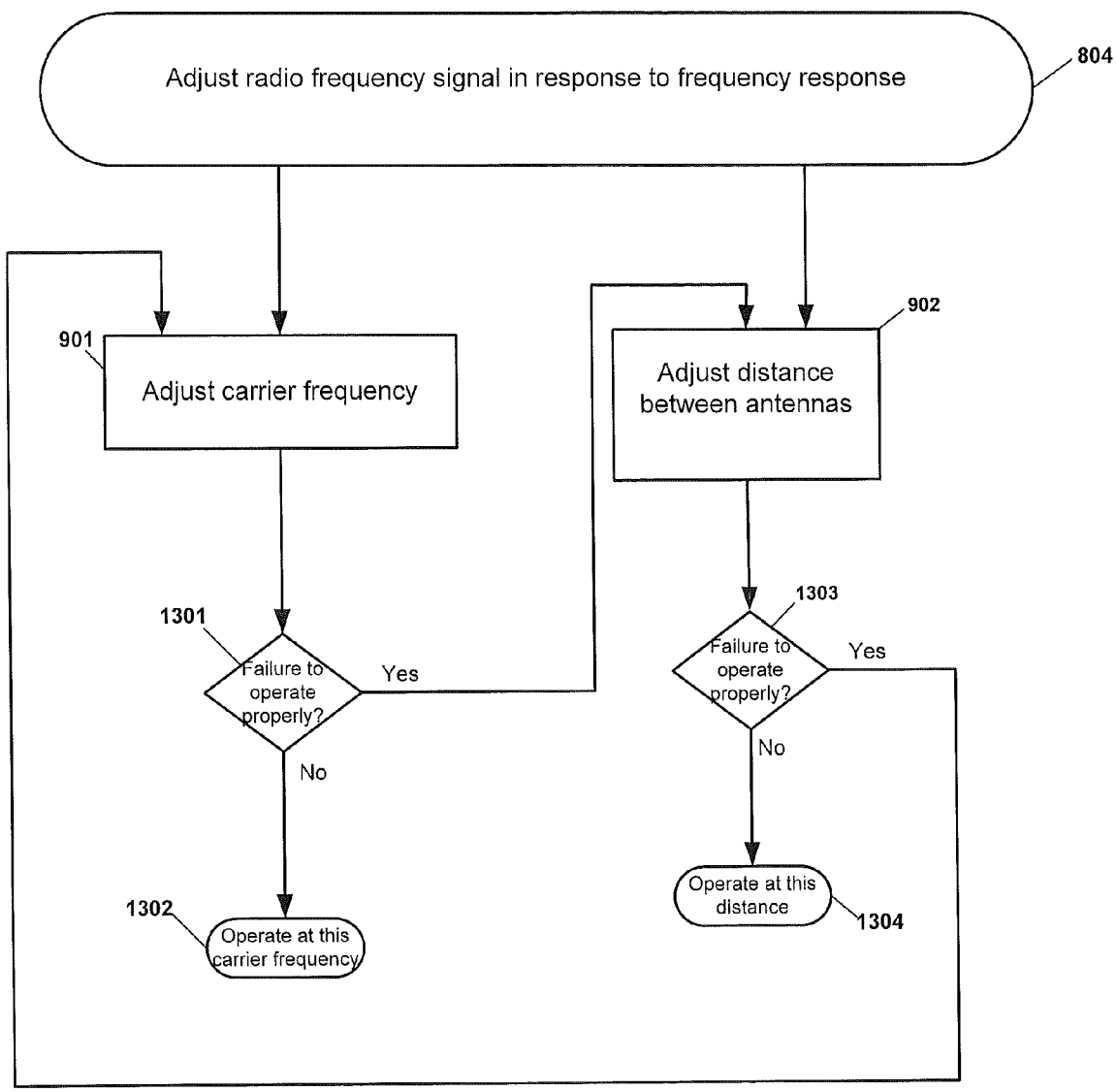
FIG. 13 is a flowchart illustrating iteratively adjusting a radio frequency signal by using a combination of carrier frequency and distance adjustment techniques, according to various embodiments described herein.

FIG. 13 is a flowchart illustrating iteratively adjusting the radio frequency signal by using a combination of carrier frequency and distance adjustment techniques, corresponding to block 804 of FIG. 8. As further illustrated in FIG. 13, in some embodiments an attempt is made to adjust the carrier frequency, as illustrated in block 901. If this action fails to attain proper operation over the radio channel, as illustrated in block 1301, then the distance between the antennas may be adjusted, as illustrated in block 902. If adjusting the carrier frequency results in proper operation at block 1301, then the radio frequency signal operates at this carrier frequency, as illustrated in block 1302. If the distance adjustment operation fails, as illustrated in block 1303, the operator may attempt further adjustments of the distance or attempt to adjust the carrier frequency, as illustrated in block 901, based on the new distance between the antennas. If adjusting the distance results in proper operation at block 1303, then the antennas operate at this distance, as illustrated in block 1304. Various permutations of adjusting the carrier frequency and adjusting the distance between antennas may be attempted before obtaining satisfactory system performance.

Adjustment of the carrier frequency and/or antenna spacing may be performed automatically, manually, or by a combination of automatic and manual adjustment. Automatic adjustment of the carrier frequency may comprise scanning across potential frequencies and selection of a suitable carrier frequency. Manual frequency selection may include obtaining operator selection of an available carrier frequency and subsequent evaluation of the selected carrier frequency to determine suitable operation. Adjustment of antenna distances may include motorized movement of the antenna, feedback mechanisms of antenna movements and recalculation of the frequency response, or providing the operator with indications as to how to move the antenna.

Figure 14:
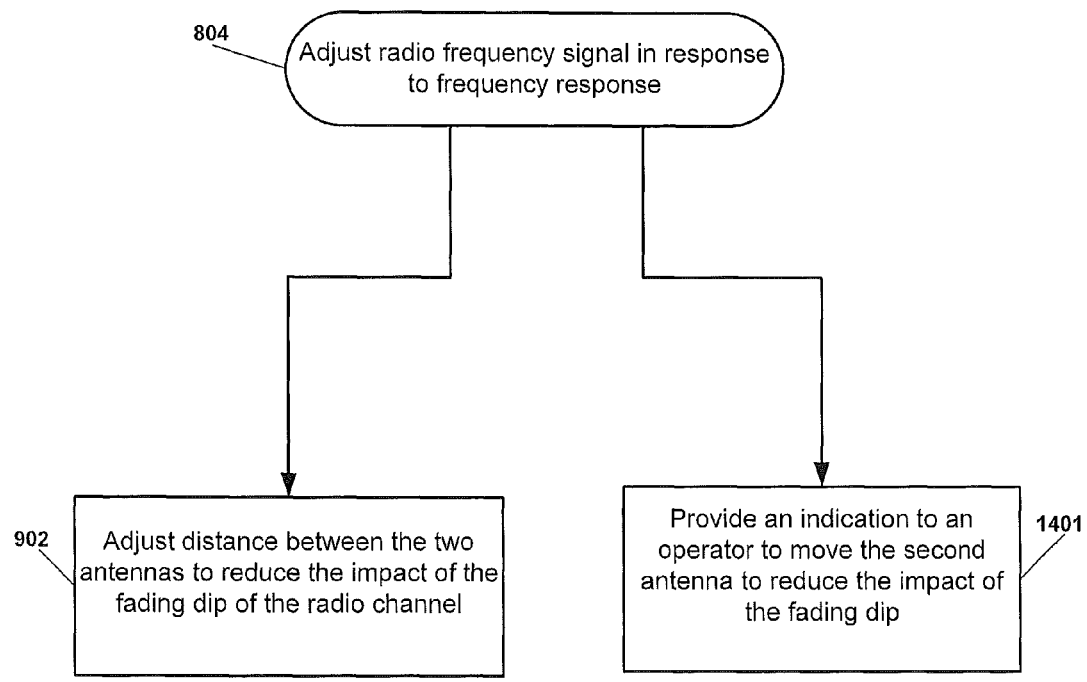
FIG. 14 is a flowchart illustrating reducing an impact of a fading dip in a radio channel by adjusting distance between antennas, according to various embodiments described herein.

FIG. 14 is a flowchart illustrating examples of reducing the impact of a fading dip in a radio channel by adjusting the distance between the antennas, corresponding to block 804 of FIG. 8. In some embodiments, as depicted in block 902, the distance between two antennas may be adjusted either manually or by some automated process or mechanism. In further embodiments, an indication for an operator to move the antenna may be provided, as illustrated in block 1401. The antenna may be a transportable antenna that is fixed in position during operation but movable when not operating. In other words, the antenna is not expected to experience significant motion during operation, such that the characterized fading dip is substantially stationary during operation.

Figure 15:
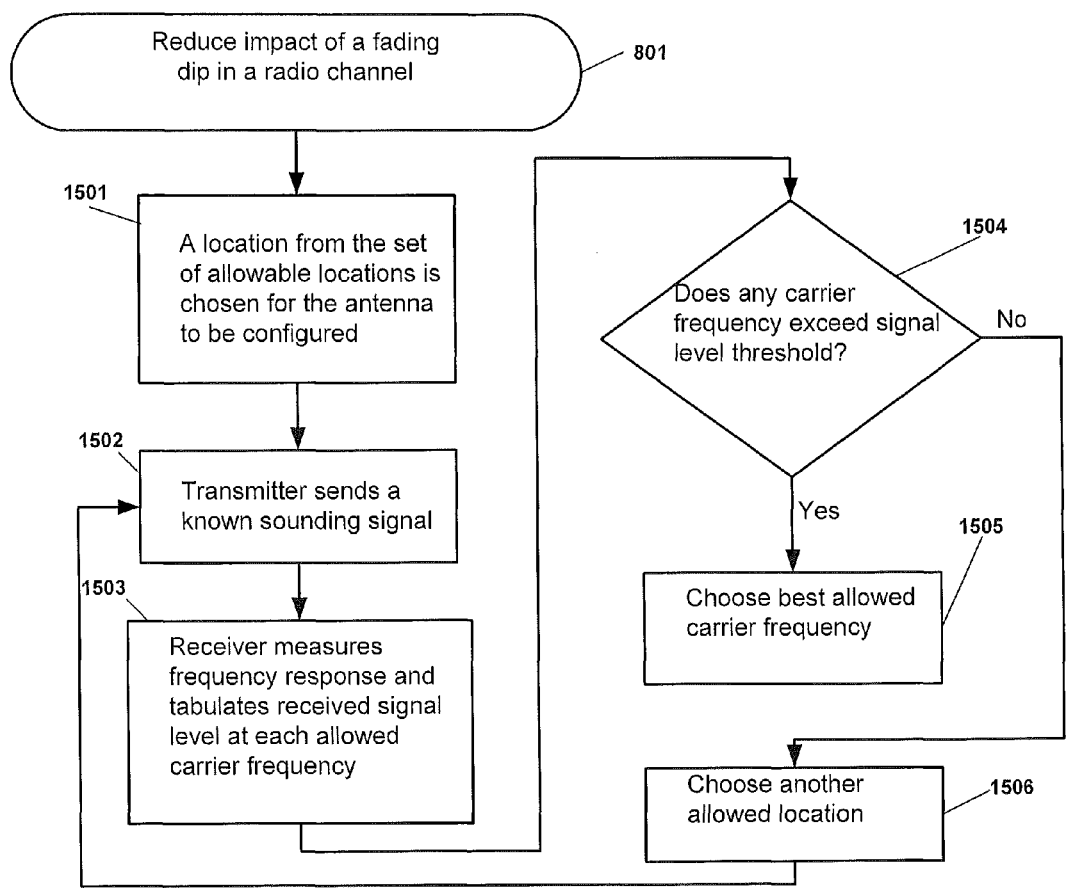
FIG. 15 is a flowchart illustrating carrier selection and/or movement of an antenna to reduce an impact of a fading dip in a radio channel, according to various embodiments described herein.

FIG. 15 is a flowchart illustrating carrier selection and movement of an antenna to reduce the impact of a fading dip in a radio channel, according to various embodiments of the present invention, corresponding to block 804 of FIG. 8. Block 1501 depicts choosing a location for the antenna from a set of allowable locations. The transmitter may send a known sounding signal, as illustrated in block 1502. In some embodiments, the receiver may measure the frequency response and/or tabulate the received signal level at each allowed carrier frequency, as illustrated in block 1503. A check may be performed to determine if some of the allowed carrier frequencies exceed a signal level threshold, as illustrated in block 1504. An allowed carrier frequency may be selected as the carrier frequency for communication, as illustrated in block 1505, and as previously described in block 901 of FIG. 9. If the allowed carrier frequencies do not exceed the signal threshold, another location for the antenna may be selected, as illustrated in block 1506 and as previously described in block 902 of FIG. 9. At the different location, the process of sending a sounding signal may be repeated, as illustrated in block 1502, and as previously described in FIG. 13.

Additional discussion of various embodiments will now be provided. Microwave wireless communication links are widely used for transporting data over short and long distances. Such links are most often set up so that there is line-of-sight (LoS) between the transceiver antennas. However, even in such LoS environments, radio channels between the transceivers may occasionally contain some multipath components. Recently, the use of wireless backhaul in non-LoS (NLoS) environments has gained interest in the telecommunications industry. The incidence of multipath channels is expected to be higher in such environments.

Generally, multipath propagation is caused by the presence of scattering objects in the environment as was shown in FIG. 5. In the case of microwave links at high frequencies, multipath may also be caused by temperature differences between air layers which cause a difference in the refraction index for the different layers.

In some embodiments, there may be a defined set of channels that are spaced apart by the signal bandwidth. For example, an operator may have three 5 MHz carriers in a total 15 MHz radio channel and one of them may be selected as the carrier frequency based on signal strength. In other embodiments, the raster size over which scanning for the best carrier frequency occurs is not the same as the radio frequency signal bandwidth to be transmitted. For example, scanning may occur for the best carrier frequency to place a 20 MHz channel over 100 kHz increments. In some embodiments, there is a fixed backhaul link where the fading does not change much. For these backhaul links, the radio frequency signal may be placed in a frequency spacing to avoid any fading dips.

In a backhaul network, the installation procedures described herein may be carried out upon initial installation of the local area base station. Subsequently, potential adjustments may be needed with a low level of periodicity to account for environmental changes and/or network topology changes. Subsequent adjustments may be made in a manner similar to that described herein.

Multipath propagation causes signal fading which may be frequency selective as was shown in FIG. 6. In other words, the reduction in received signal magnitude may be frequency dependent. Such fading is detrimental to link performance and may impact the throughput that can be supported on the communication link.

Fading characteristics are in general dependent on the relative locations of the two antennas in a link and of scattering objects in the environment that produce multipath reflections. The multipath fading channel may vary in time if either of the transceivers or the scattering objects experience motion. Fading characteristics are also dependent on the carrier frequency at which the link is operating.

Some of the performance loss caused by signal fading may be recovered or compensated for through the use of equalization techniques at the receiver albeit at the expense of increased complexity. Further, the complexity of equalization techniques may increase rapidly for higher order modulations such as 64-QAM or 256-QAM. It may be beneficial to reduce or avoid the effects of multipath fading before and/or after modulation operations are performed.

Embodiments described herein may apply to installation of equipment for a microwave backhaul link or more generally for any wireless link that has fixed or transportable antennas at both ends and a scattering environment that is largely motion-free and leads to a multi-path channel. As described herein, the impact of signal fading dips are reduced by adjusting the carrier frequency that is used for the link and/or by adjusting the precise position of the antennas.

The channel response for a signal transmitted at a carrier frequency of 60 GHz through a 2-path channel was shown in FIG. 7. FIG. 7 shows the response for two cases. In the first case, the relative time delay between the two paths is 6 nanoseconds (ns). In the second case, the relative delay is 10 ns. The figure shows a 28 MHz signal bandwidth placed in the 60 GHz band so that the signal avoids fading dips caused by the multipath channel within the transmitted bandwidth.

In some embodiments, a sounding signal that has much wider bandwidth than the signal bandwidth of interest is sent from one of the antennas whose position is assumed to be already fixed. For example, in the example illustrated in FIG. 7, the sounding signal may occupy a bandwidth of 100 MHz which is greater than the signal bandwidth of 28 MHz. The receiving antenna at the other end of the link, whose position and carrier frequency are to be computed, receives the wideband sounding signal and uses the fact that the sounding signal is known to estimate the frequency response of the channel. The resulting response, which is similar to that shown in FIG. 7, may be used by the receiver to choose from a set of allowed carrier frequencies by selecting the frequencies that satisfy a threshold for a minimum average received signal level, as was described in FIG. 10. If there are multiple frequencies that satisfy the threshold and are allowed, the one with the best received signal level may be chosen. If none of the allowed frequencies satisfy the received threshold, then the antenna may be moved to one of the other allowed nearby locations and the procedure may be repeated to find an allowed carrier frequency that satisfies the threshold for the minimum average received signal level, as was described in FIG. 13. The distances between the considered locations in general may be smaller as the carrier frequency increases although the distances at which the fading dips become statistically independent may depend on the scatter object geometry and number of scatter objects in the environment. An alternate criterion for choosing the carrier frequency is the one with a low or the lowest variation between the minimum and maximum signal levels within the signal bandwidth, as illustrated in FIG. 11. The criterion used also may be selected based on a first estimate of the frequency selectivity of the channel. For example, if the channel is considered to be mostly flat within the signal bandwidth, an absolute signal threshold level may be chosen as the criterion for choosing the carrier frequency and/or location. However, if the channel is considered to have significant variation within the signal bandwidth, the lowest variation between maximum and minimum signal levels may be chosen as the criterion.

In embodiments of the invention, the transmitter sends a known signal that is of the same bandwidth as the signal bandwidth of interest (28 MHz in the above example) instead of a wideband sounding signal. The carrier frequency of the known signal is varied across the frequency range of interest (100 MHz in the above example) and the received signal levels are recorded for each of the carrier frequencies. The best carrier frequency and location are then chosen from the allowed carrier frequencies and locations in the same manner as described in the previous embodiments. The procedures outlined above are shown in FIG. 15.

The detrimental effects of multipath fading for fixed microwave links are mitigated by the use of techniques to avoid fading dips by varying the carrier frequency and/or location of the antennas in the link. The use of these installation techniques can improve received signal levels and hence may result in improved ranges over which the microwave links could operate.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

As used herein, the term "user equipment" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of reducing an impact of a fading dip in a radio channel between a first antenna and a second antenna, the method comprising:

receiving a sounding signal at the first antenna or the second antenna over the radio channel;

measuring a frequency response of the radio channel using the sounding signal that was received; and adjusting, in response to the measuring of the frequency response, a carrier frequency for transmission of a radio frequency signal in the radio channel that is used to communicate between the first antenna and the second antenna, to reduce an impact of the fading dip in the radio channel on the radio frequency signal.

2. A method according to claim 1 wherein the adjusting the carrier frequency comprises:

selecting a carrier frequency for transmission of the radio frequency signal between the first antenna and the second antenna from a set of available carrier frequencies, wherein the available carrier frequencies are more closely spaced apart than a bandwidth of the radio frequency signal.

3. A method according to claim 2 wherein the adjusting a carrier frequency further comprises:

determining, from a set of available carrier frequencies, a subset of acceptable carrier frequencies whose average received radio frequency signal level within a bandwidth of the radio frequency signal exceed a minimum average received radio frequency signal level; and selecting, from the subset of acceptable carrier frequencies, a carrier frequency for transmission of the radio frequency signal between the first antenna and the second antenna.

4. A method according to claim 3 wherein the selecting a carrier frequency comprises:

selecting a carrier frequency corresponding to a greatest average received signal level.

5. A method according to claim 2, wherein the adjusting a carrier frequency further comprises:

determining, for respective ones of the set of available carrier frequencies, a variation between a minimum and maximum signal level within the radio frequency signal bandwidth; and selecting the carrier frequency based on the variation between the minimum and maximum signal levels within the radio frequency signal bandwidth.

6. A method according to claim 2, wherein the adjusting a carrier frequency further comprises:

determining, for respective ones of the set of available carrier frequencies, a variation between a minimum and maximum signal level within the radio frequency signal bandwidth;

determining a subset of acceptable carrier frequencies whose variation between the minimum and maximum signal level within the radio frequency signal bandwidth is below a threshold; and selecting, from the subset of acceptable carrier frequencies, a carrier frequency for transmission of the radio frequency signal between the first antenna and the second antenna.

7. A method according to claim 5, wherein the selecting the carrier frequency comprises:

selecting the carrier frequency with a lowest variation between the minimum and maximum signal levels.

8. A method according to claim 1, wherein the second antenna is a second transportable antenna that is fixed in position during operation thereof but is movable in position when not operating, and wherein the adjusting the radio frequency signal comprises:

adjusting a distance between the first antenna and the second transportable antenna, to reduce the impact of the fading dip of the radio channel on the radio frequency signal during the operation thereof.

9. A method according to claim 1, wherein the second antenna is a second transportable antenna that is fixed in position during operation thereof but is movable in position when not operating, and wherein the adjusting the radio frequency signal comprises:

providing an indication for an operator to move the second transportable antenna to reduce the impact of the fading dip of the radio channel on the radio frequency signal during the operation thereof.

10. A method according to claim 1 wherein the adjusting the radio frequency signal in the radio channel further comprises:

adjusting a distance between the first antenna and the second antenna to reduce the impact of the fading dip of the radio channel on the radio frequency signal during the operation thereof, in response to the adjusting of the carrier frequency failing to sufficiently reduce the impact of the fading dip of the radio channel on the radio frequency signal.

11. A method according to claim 10, wherein the second antenna comprises an array of antennas, and wherein the adjusting the distance between the first antenna and the second antenna comprises:

selecting, from the array of antennas, an antenna for use in communication between the first antenna and the second antenna.

12. A method according to claim 8, wherein the second antenna comprises an array of antennas, and wherein the adjusting the distance between the first antenna and the second antenna comprises:

selecting, from the array of antennas, an antenna for use in communication between the first antenna and the second antenna.

13. A method according to claim 1, wherein the sounding signal has a bandwidth that is less than a bandwidth of the radio channel, and wherein the measuring the frequency response of the radio channel comprises scanning the radio channel by varying the frequency of the sounding signal.

14. A method according to claim 1, wherein the sounding signal has bandwidth equal to the radio frequency signal.

15. A method according to claim 1, wherein the sounding signal has bandwidth equal to the radio channel.

16. A method according to claim 1, wherein the first antenna is included in a node of a wireless communication network, wherein the second antenna is included in a local area base station of the wireless communication network, and wherein the radio channel comprises a backhaul link between the node of the wireless communication network and the local area base station.

17. A local area base station comprising:

an antenna;

a transceiver configured to receive a sounding signal at the antenna over a radio channel; and a controller configured to:

measure the frequency response of the radio channel using the sounding signal that was received; and adjust, in response to the frequency response that was measured, a carrier frequency used to transmit by the transceiver in the radio channel, to reduce an impact of a fading dip in the radio channel on the radio frequency signal during operation thereof.

18. The local area base station of claim 17,
wherein the antenna is a transportable antenna that is fixed in position during operation thereof but is movable in position when not operating, and
wherein when adjusting the radio frequency signal, the local area base station is further configured to:
provide an indication for an operator to move the local area base station to reduce the impact of the fading dip of the radio channel on the radio frequency signal.

19. The local area base station of claim 17,
wherein the antenna is a transportable antenna that is fixed in position during operation thereof but is movable in position when not operating, and
wherein when adjusting the radio frequency signal, the local area base station is further configured to:
move the local area base station to reduce the impact of the fading dip of the radio channel on the radio frequency signal.

20. A node of a wireless communication network comprising:
an antenna;
a transceiver configured to receive a sounding signal at the antenna over a radio channel; and
a controller configured to:
measure the frequency response of the radio channel using the sounding signal that was received; and
adjust, in response to the frequency response that was measured, a carrier frequency used by the transceiver, to reduce an impact of a fading dip in the radio channel on a radio frequency signal.

21. The node of the wireless communication network of claim 20 wherein the controller is further configured to:
determine, from a set of available carrier frequencies, a subset of acceptable carrier frequencies whose average received radio frequency signal level within a bandwidth of the radio frequency signal exceed a minimum average received radio frequency signal level and/or whose variation of received radio frequency signal level within the radio frequency signal bandwidth falls between a minimum and maximum signal level; and
select, from the subset of acceptable carrier frequencies, a carrier frequency for use by the transceiver.

* * * * *